United States Patent
[11] 3,599,020

| [72] | Inventors | John P. Harris<br>Boulder, Colo.;<br>Paul Y. Hu, Boulder, Colo.; Ernest G. Newman, Los Gatos, Calif. |
|---|---|---|
| [21] | Appl. No. | 15,105 |
| [22] | Filed | Feb. 27, 1970 |
| [45] | Patented | Aug. 10, 1971 |
| [73] | Assignee | International Business Machines Corporation<br>Armonk, N.Y. |

[54] LINEAR ACTUATOR WITH ALTERNATING MAGNETIC POLES
11 Claims, 7 Drawing Figs.

[52] U.S. Cl. .................................................... 310/13, 310/27, 179/117
[51] Int. Cl. .................................................... H02k 41/02
[50] Field of Search ........................................ 179/117, 119, 115.5, 120; 335/231, 222; 310/12—14, 27, 154

[56] References Cited
UNITED STATES PATENTS

| 1,895,071 | 1/1933 | Fanger | 179/120 X |
| 2,540,487 | 2/1951 | Mott | 179/120 |
| 3,417,268 | 12/1968 | Lace | 310/27 |
| 3,439,198 | 4/1969 | Lee | 310/13 |

FOREIGN PATENTS

| 705,100 | 3/1954 | Great Britain | 179/115.5 |

*Primary Examiner*—D. F. Duggan
*Attorneys*—Hanifin and Jancin and Francis A. Sirr ABSTRACT: A linear actuator having an axially movable tubular armature which is encircled by a first even numbered group of alternate magnetic poles and by a second even numbered but axially displaced group of alternate magnetic poles; the second group of poles alternate with each other and with the poles of the first group. The armature carries conductor segments adjacent to each of the poles. These conductor segments extend normal to the axial direction of armature movement. Current supply means is effective to cause currents to flow in the proper direction in each of the conductor segments such that the conductor segments jointly contribute to a composite force causing axial movement of the armature.

PATENTED AUG 10 1971

INVENTORS
JOHN P. HARRIS
PAUL Y. HU
ERNEST G. NEWMAN

BY
*Francis A. Sirr*

ATTORNEY

PATENTED AUG 10 1971 3,599,020

LINEAR ACTUATOR WITH ALTERNATING MAGNETIC POLES

BACKGROUND AND SUMMARY OF THE INVENTION

Linear actuators are a form of electric motor wherein the magnetic field created by current flow through a conductor interacts with the magnetic field created by stationary magnetic poles to cause linear movement of the conductor.

Prior art linear actuators are generally of unitary pole construction and conductor segments are oriented within the influence of the poles and extend generally normal to the direction of linear movement. The axial magnetic flux path of these actuators includes a core, usually centrally disposed, whose tendency to saturate limits the flux density, and, thus, the output force, which can be produced by the magnetic poles.

The present invention provides an even number of poles which are displaced in a direction transverse to the direction of linear movement of the armature, and which alternate in magnetic polarity, resembling the pole pieces of a rotary direct current motor. These poles establish a flux which flows radially and tangentially in a plane which is transverse to the direction of motion. The armature conductor segments extend in a direction to produce linear motion of the armature. With such a structure, each pair of poles is provided with its own tangential magnetic flux return path and, as the number of poles is increased, as the length of the poles along the direction of movement is increased, or as the strength of the poles is increased, there is less tendency for the return path to saturate than in prior art structures.

More specifically, the preferred embodiment of the present invention provides a linear actuator having a tubular armature which moves linearly along its axis. A central core member is positioned within the armature and provides a magnetic flux return path. The armature is surrounded by a cluster of pole pieces, a first even numbered group of which circumferentially places alternate poles about the armature in a first plane which is normal to the motion axis. A second even numbered group of pole pieces is axially displaced from the first group and also places alternate poles about the armature in a second axially displaced plane which is normal to the axis. The poles of the first and second group not only circumferentially alternate within the group, but also, the poles axially alternate from one group to the other. The armature carries winding segments which are sectors of a circle and which lie in planes normal to the armature axis.

With this structure, each pair of magnetic poles has a radial flux path which includes a unique portion of the central core member which is disposed within the armature. As more poles are added, as the axial length of the poles are increased, or as the strength of the poles is increased, there is no increase in tendency to saturate the central core of the actuator.

The foregoing and other objects, features, and advantages of the invention will be apparent from the following more particular description of preferred embodiments of the invention, as illustrated in the accompanying drawings.

DESCRIPTION OF THE PREFERRED EMBODIMENTS

Figure 1:
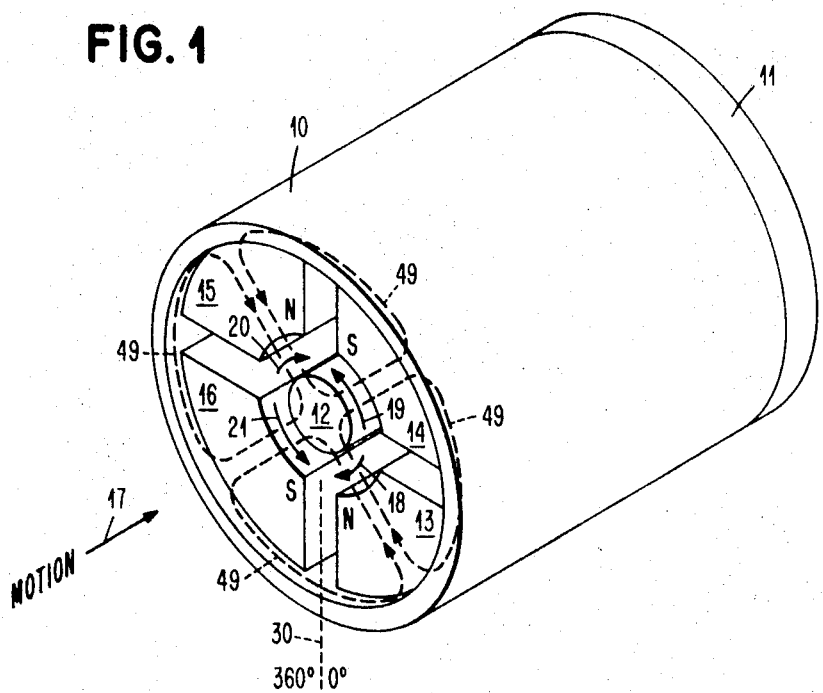
FIG. 1 is a perspective view of the magnetic structure of a four-pole, two-layer tubular linear actuator embodying the present invention.

FIG. 1 discloses the perspective view of a magnetic structure constructed in accordance with the teachings of the present invention, wherein a tubular-shaped linear actuator is provided with two axially disposed layers of magnetic poles, each layer having four individual pole pieces. In accordance with the teaching of this invention, the linear actuator may have any number of axial layers of pole pieces, however, each layer must have 13—even number of poles. Specifically, the magnetic structure of FIG. 1 includes an outer tubular member 10 of soft iron or low carbon steel whose right-hand extremity is closed by a plate 11, which mounts a centrally disposed core member 12, also of soft iron. FIG. 1 discloses only the first layer of magnetic pole pieces comprising four poles 13, 14, 15, and 16. As can be seen, poles 13–16 circumferentially surround core member 12 and alternate in magnetic polarity in a direction transverse to the direction of linear motion of the armature, this direction being represented by motion vector 17. More specifically, the face of pole piece 13 adjacent core 12 is a north magnetic pole, the corresponding face of pole piece 14 is a south magnetic pole, the corresponding face of pole piece 15 is a north magnetic pole, and the corresponding face of pole piece 16 is a south magnetic pole.

To simplify the showing of FIG. 1, the movable armature and the individual conductor segments carried by this armature are not disclosed. The armature and its conductor segments are represented by arcuate lines 18, 19, 20, and 21, which represent composite currents carried by the conductor segments in the area of the respective poles. Each of these arcuate lines carries an arrow which represents the direction of current flow in the conductor segments of the armature associated with the respective adjacent magnetic pole piece to produce the direction of linear movement represented by vector 17.

Figure 2:
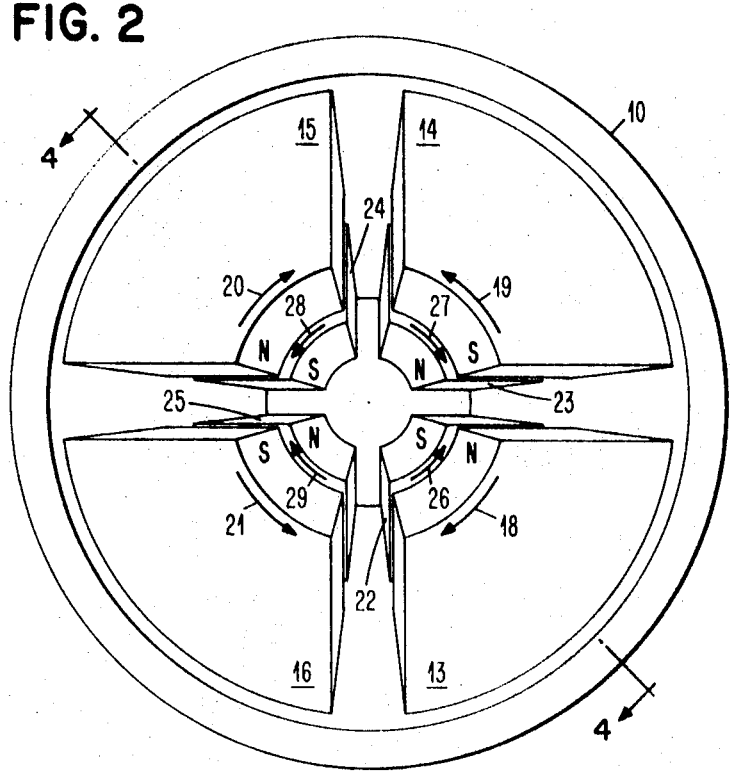
FIG. 2 is a front single-point perspective view of the structure of FIG. 1, with the central core member removed.

FIG. 2 is a single-point perspective view of the structure of FIG. 1, taken in the direction of vector 17. In this figure, the second four-pole layer of magnetic pole pieces can be seen. As with the first layer of pole pieces 13—16, the second layer of pole pieces 22, 23, 24, and 25 lies in a plane which is generally normal to the direction of linear movement of the armature, represented by vector 17. Here again, the magnetic polarity of the pole pieces 22—25 alternates circumferentially about the direction of linear motion 17, this being transverse to the direction of linear motion. Also, the magnetic polarity of the pole pieces 22—25 alternates in an axial direction, along vector 17, such that the face of pole piece 22 adjacent the armature is a south pole, the corresponding face of pole piece 23 is a north pole, the corresponding face of pole piece 24 is a south pole, and the corresponding face of pole piece 25 is a north pole.

In order to simplify the structure disclosed in FIG. 2, central core member 12 and the linearly movable armature are not disclosed. The arcuate lines 26, 27 28, and 29 represent a composite current which flows in the conductor segments mounted on the circumference of the armature associated with the respective pole pieces 22, 23, 24, and 25. Lines 26—29 can also be said to represent a composite of the conductor segments which are carried by the armature and which extend in a direction generally normal to the axial direction of linear movement represented by vector 17.

Figure 3:
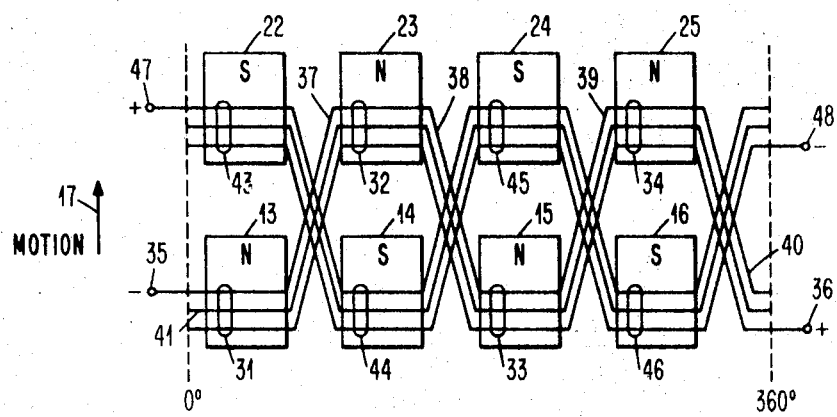
FIG. 3 is a view of the magnetic poles of FIG. 1 and a first form of armature winding, wherein the tubular linear actuator is shown with its 360° tubular shape placed on a single plane.

FIG. 3 is a diagrammatic view of the magnetic poles of the structure in FIGS. 1 and 2, wherein tubular housing 10 has its sidewall axially sectioned, as at broken line 30 of FIG. 1, housing 10 then being laid flat with its 360° tubular shape placed on a single plane. In FIG. 3, the faces of the respective pole pieces shown in FIG. 2 which are adjacent the surface of the movable armature are seen and are identified by reference numerals 13—16 and 22—25. The direction of motion vector 17 shows that motion of the armature is in an upward direction, this corresponding to the direction of motion vector 17 of FIG. 1.

FIG. 3 likewise discloses a form of armature winding and its spatial orientation with respect to the magnetic pole pieces. To simplify the disclosure of FIG. 3, the tubular armature is not disclosed. The tubular armature may take a number of forms; for example, it may be a printed circuit armature. It suffices to say that the armature supports the various conductor segments disclosed in FIG. 3.

The winding means disclosed in FIG. 3 comprises first conductor segments 31, 32, 33, and 34. These conductor segments are adjacent north magnetic poles 13, 23, 15, and 25, respectively, and extend in a direction generally normal to the direction of motion vector 17. Relating the first conductor segments to the structure of FIG. 2, segments 31 correspond to composite current vector 18, segments 32 correspond to vector 27, segments 33 correspond to vector 20, and segments 34 correspond to vector 29. The first conductor segments 31—34 are interconnected to form a continuous coil having end terminals 35 and 36. This coil can be traced from terminal 35 through the upper one of the conductors of segments 31, where the winding moves in the direction of motion vector 17 by means of an interconnecting conductor 37, through the upper of the conductors of segments 32, where the winding moves in the opposite direction to motion vector 17, by way of conductor 38, to the upper conductor of segment 33. The winding then again moves in the direction of motion vector 17, by way of conductor 39, to the upper conductor of segments 34, where the winding then again moves in a direction opposite to motion vector 17 to the portion of a conductor labeled 40. Portion 40 of the conductor lies at the 360° point on the tubular armature, this corresponding to the 0° point represented at the left-hand side of FIG. 1; thus, in fact, conductor 40 is the same as conductor 41 identified as the middle conductor of segment 31. In this manner, the winding continues to advance around the armature and, after making three turns, terminates at terminal 36. For the magnetic polarities shown in FIG. 2, and for the composite current vectors shown in this figure, terminal 36 is connected to a source of positive potential, and terminal 35 is connected to a source of negative potential.

In the manner above-described, it can be shown that a further group of second conductor segments 43, 44, 45, and 46 which are associated with magnetic pole pieces 22, 14, 24, and 16, respectively, are interconnected to form a single three-turn winding having end terminals 47 and 48. Here again, for the magnetic polarities and for the composite current vectors disclosed in FIG. 2, terminal 47 is connected to a source of positive direct current voltage and terminal 48 is connected to a negative source of direct current voltage.

Relating the conductor segments 43—46 to the composite current vectors disclosed in FIG. 2, segment 43 corresponds to composite current vector 26, segment 44 corresponds to vector 19, segment 45 corresponds to vector 28, and segment 46 corresponds to vector 21.

The two coils, having end terminals 35, 36, and 47, 48 can be connected in series or parallel, to produce additive motion forces.

Figure 4:
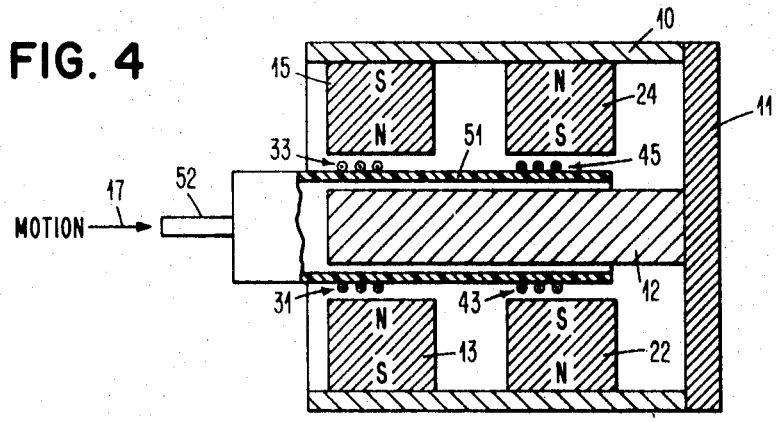
FIG. 4 is a section view of FIG. 2, taken along the line 4—4 and showing the tubular armature.

FIG. 4 is a section view of the structure of FIG. 2 taken along the line 4—4. This figure shows more clearly the manner in which centrally disposed core 12 is supported by end plate 11. Since end plate 11 carries no magnetic flux, it may be made of a variety of materials. This has been shown in an elementary form. Openings in the housing would be provided such that the structure can be cooled.

As shown in FIG. 4, each pair of magnetic poles, both the pairs which are axially disposed and the pairs which are radially disposed, have a unique magnetic return path, independent of the magnetic return paths of the other pairs of magnetic poles. In FIG. 1, reference numeral 49 identifies the magnetic flux paths associated with the poles 13—16. Similar flux paths are associated with poles 22—25. Flux does not link the poles of group 13—16 and the poles of group 22—25. Also disclosed in FIG. 4, is movable tubular armature 51 which is connected to an output shaft 52. This tubular armature carries the winding means as disclosed in FIG. 3, and more specifically, the conductors of segment 33 associated with the face of magnetic pole 15 are disclosed, as are the conductors of segment 31 associated with magnetic pole 13, the conductors of segment 45 associated with pole 24, and the conductors of segment 43 associated with pole 22.

A preferred construction of the present invention provides a dimensional relationship between the axial length of the magnetic poles and the axial span of the individual coil segments such that, within the axial distance that the armature is adapted to move, the individual segments at all times remain adjacent their own respective pole piece. More specifically, the dimension of pole piece 13 in the direction of the motion vector 17 (see FIGS. 3 and 4) is substantially greater than the span of the conductors of segment 31 taken along this same direction. Armature 51 is adapted to move to the right in FIG. 4, as indicated by motion vector 17, its movement being limited in this direction such that the conductors of segment 31 at all times remain adjacent the face of magnet 13. A similar structural relationship exists between each group of conductor segments and its respective magnetic pole.

Figure 5:
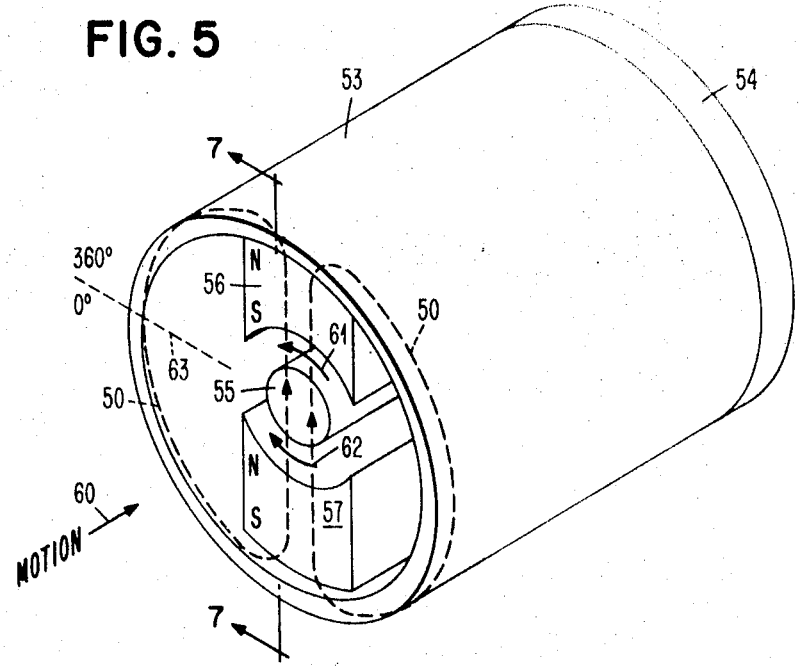
FIG. 5 is a perspective view of a two-pole, two-layer tubular armature actuator embodying the present invention.

FIG. 5 discloses the perspective view of a two-pole, two-layer tubular linear actuator constructed in accordance with the present invention. Here again, a tubular magnetic housing 53 having an end plate 54 supports a centrally disposed magnetic core member 55. The first two-pole layer of magnets includes pole pieces 56 and 57. Immediately behind this first layer of magnets is a second layer of magnets including the two pole pieces 58 and 59, disclosed in FIG. 7. The flux path generated by pole pieces 56 and 57 is identified as 50. Similar flux paths are generated by pole pieces 58 and 59.

The linearly movable armature, which is adapted to move in the direction of motion vector 60, is not shown in FIG. 5. This armature carries conductors which extend in an arcuate fashion generally normal to the direction of motion vector 60. The conductor current which flows in the area adjacent the face of pole piece 56 is represented by composite current vector 61, whereas the current which flows in the portion of the armature adjacent pole piece 57 is indicated by composite current vector 62. The individual conductors which produce current vectors 61 and 62, and the direction of current flow therein, are more clearly disclosed in FIGS. 6 and 7.

Figure 6:
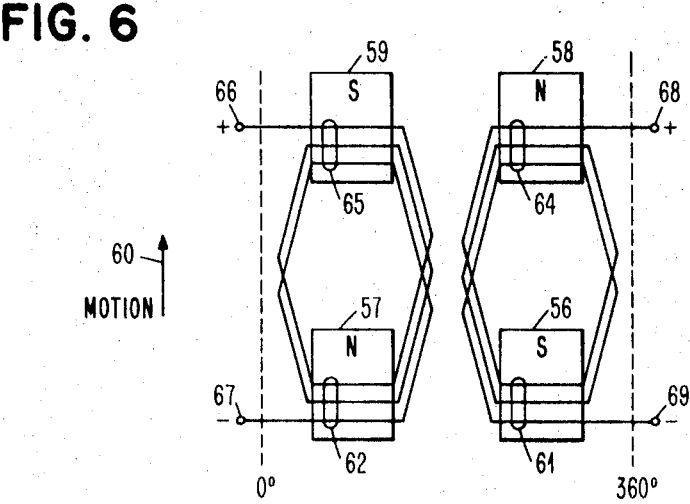
FIG. 6 is a view of the magnetic poles of FIG. 5 and another form of armature winding, wherein the tubular linear actuator is shown with its 360° tubular shape placed on a single plane.

FIG. 6 is a diagrammatic view of the two magnetic pole-two layer device of FIG. 5 wherein tubular housing 53 has its sidewall axially sectioned, as at broken line 63 of FIG. 5, housing 53 then being laid flat with its 360° tubular shape placed on a single plane. An alternate form of armature winding is disclosed in FIG. 6. Using the terminology as applied to the conductor segments of FIG. 3, the first conductor segments are those segments associated with a north magnetic pole and the second conductor segments are those associated with a south magnetic pole. In the form of armature winding of FIG. 6, the first group of conductor segments 62 associated with north magnetic pole 57 is connected in series with the second group of conductor segments 65 associated with the south magnetic pole 59. These segments 62 and 65 are interconnected by means of conductors which extend both transversely and axially to form a single multiturn coil having end terminals 66 and 67. For the magnetic polarities selected and for the direction of motion vector 60 to be produced, terminal 66 is connected to a source of positive direct current voltage and terminal 67 is connected to a source of negative direct current voltage.

In the form of armature winding disclosed in FIG. 6, the group of second conductor segments 61 associated with south magnetic pole 56 is connected in series with the group of first conductor segments 64 associated with north magnetic pole 58. Here again, the individual conductors of these two groups of conductor segments are interconnected by means of conductors which extend both transversely and axially to motion vector 60 to form a multiturn coil having end terminals 68 and 69; terminal 68 being connected to a source of positive direct current voltage and terminal 69 being connected to a source of negative direct current potential.

Conductor groups 66—67 and 68—69 could again be connected in parallel or series combinations.

Figure 7:
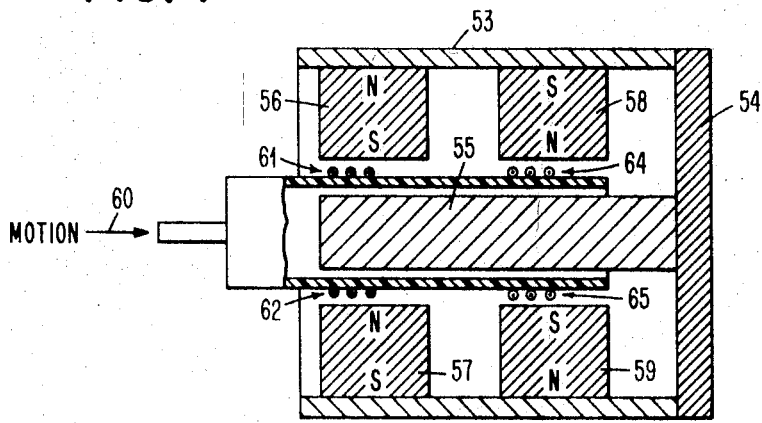
FIG. 7 is a section view of FIG. 5, taken along the line 7—7 and showing the tubular armature.

A linear actuator constructed in accordance with the teachings of this invention (for example, as shown in FIGS. 4 and 7) is preferably constructed such that the movable armature has its range of linear movement constrained or limited. This range of movement is related to the axial dimension of segments 31, 33, 43, and 45 of FIG. 4, and segments 61, 62, 64, and 65 of FIG. 7, such that the segments at all times overlie their respective poles within the range of movement of their armature. The linear movement of the armatures of FIGS. 4 and 7 may be constrained by stop means, not shown.

While the invention has been particularly shown and described with reference to preferred embodiments thereof, it will be understood by those skilled in the art that various changes in form and details may be made therein without departing from the spirit and scope of the invention.

What we claim is:

1. A linear magnetic actuator, comprising:
an armature movable in a linear direction,
magnet means establishing alternate north and south poles transverse to said linear direction,
winding means disposed on said armature, said winding means having first conductor segment means arranged generally normal to said linear direction adjacent said north poles, and having second conductor segment means arranged generally normal to said linear direction adjacent said south poles, and
electrical current supply means connected to said first and second conductor segment means to produce current flow therein such that said first and second conductor segment means jointly contribute forces causing movement of said armature in said linear direction.

2. A linear actuator as defined in claim 1 wherein said magnet means establishing alternate north and south poles transverse to said linear direction also establishes alternate north and south poles linearly displaced in said linear direction.

3. A linear actuator as defined in claim 2 wherein said first conductor segment means adjacent said north poles are connected to said electrical current supply means to carry electrical current in a first direction relative to said linear direction, and wherein said second conductor segment means adjacent said south poles are connected to said electrical current supply means to carry electrical current in the opposite direction relative to said linear direction.

4. A linear actuator as defined in claim 3 wherein the first conductor segment means adjacent a given north pole are connected to the second conductor segment means adjacent the south pole which is linearly displaced therefrom.

5. A linear actuator as defined in claim 1 wherein said magnetic means establishes an even number of alternate north and south poles transverse to said linear direction, and establishes alternate north and south poles in said linear direction, wherein the first conductor segments of said winding means traverse said north poles and are interconnected by conductor segments which both lie intermediate adjacent poles and extend generally in said linear direction to the first conductor segments of an adjacent linearly displaced north pole, and wherein the second conductor segments of said winding means traverse said south poles and are interconnected by conductor segments which both lie intermediate adjacent poles and extend generally in said linear direction to the second conductor segments of an adjacent linearly displaced south pole, such that said interconnecting conductor segments overlap intermediate adjacent transversely displaced poles.

6. A linear actuator as defined in claim 5, wherein said first conductor segments are interconnected to form a first multiturn coil which traverses the magnetic field established by said magnetic means in a tortuous path such that said coil is normal to said linear direction adjacent each of said north poles and extends in said linear direction to the adjacent linearly displaced north pole when in the area which separates adjacent transversely displaced poles, and wherein said second conductor segments are interconnected to form a second multiturn coil which traverses the magnetic field established by said magnetic means in a tortuous path such that said coil is normal to said linear direction adjacent each of said south poles and extends in said linear direction to the adjacent linearly displaced south pole when in the area which separates adjacent transversely displaced poles.

7. A linear actuator as defined in claim 1, wherein said armature is a tubular armature surrounding a stationary magnetic return path core, said armature being linearly movable along the axis thereof, and wherein said magnetic means establishes an even number of alternate north and south poles circumferentially about said axis, and establishes alternate north and south poles along said axis to establish radial and tangential flux paths in a plane transverse to said linear direction.

8. A linear actuator as defined in claim 7 wherein the first conductor segments adjacent a given north pole are interconnected with the second conductor segments adjacent an axially displaced south pole to form a multiturn coil having a pair of end terminals.

9. A linear actuator as defined in claim 7 wherein the first conductor segments adjacent a given north pole are interconnected with the first conductor segments adjacent the axially and circumferentially displaced north pole to form a first multiturn coil having a pair of end terminals, and wherein the second conductor segments adjacent a given south pole are interconnected with the second conductor segments adjacent the axially and circumferentially displaced south pole to form a second multiturn coil having a pair of end terminals.

10. A linear actuator as defined in claim 8 wherein said armature is adapted to move a given distance along the axis thereof, and wherein the axial dimension of said coil is such that the conductor segments of said coil at all times remain adjacent their respective magnetic poles during said armature movement.

11. A linear actuator as defined in claim 9 wherein said armature is constrained to move only a given distance along the axis thereof, and wherein the axial dimension of each of said coils as related to the axial dimension of said poles is such that the conductor segments of each of said coils at all times overlie their respective poles within the range of movement of said armature.